(12) United States Patent
Wang et al.

(10) Patent No.: US 11,950,205 B2
(45) Date of Patent: Apr. 2, 2024

(54) METHOD FOR CONFIGURING PAGING OCCASION, TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Shukun Wang, Dongguan (CN); Cong Shi, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 280 days.

(21) Appl. No.: 17/470,017

(22) Filed: Sep. 9, 2021

(65) Prior Publication Data

US 2021/0410106 A1 Dec. 30, 2021

Related U.S. Application Data

(63) Continuation of application No. PCT/CN2019/079573, filed on Mar. 25, 2019.

(51) Int. Cl.
*H04W 68/02* (2009.01)
*H04W 72/23* (2023.01)

(52) U.S. Cl.
CPC ........... *H04W 68/02* (2013.01); *H04W 72/23* (2023.01)

(58) Field of Classification Search
None
See application file for complete search history.

(56) References Cited

U.S. PATENT DOCUMENTS

2017/0127381 A1 5/2017 Yavus et al.

FOREIGN PATENT DOCUMENTS

| CN | 108282862 A | 7/2018 |
| CN | 109246818 A | 1/2019 |
| CN | 109451849 A | 3/2019 |
| EP | 2369883 A1 | 9/2011 |
| WO | 2018151534 A1 | 8/2018 |

OTHER PUBLICATIONS

Samsung—3GPP TSG-RAN2 105, R2-1900135 (Year: 2019).*
3GPP TS 38.304 V15.2.0 (Dec. 2018) (Year: 2018).*
3rd Generation Partnership Project; "Technical Specification Group Radio Access Network; NR; Radio Resource Control (RRC) protocol specification (Release 15)", 3GPP TS 38.331 V15.4.0 (Dec. 2018). 474 pages.

(Continued)

*Primary Examiner* — Adolf Dsouza
(74) *Attorney, Agent, or Firm* — Perkins Coie LLP

(57) ABSTRACT

A method for configuring a paging occasion includes that: a terminal receives first configuration information from a network device, where the first configuration information is used for determining at least one first paging occasion; each of the at least one first paging occasion is associated with at least one second paging occasion; and the first paging occasion and the second paging occasion are used for transmitting scheduling information of a paging message. A terminal and a non-transitory computer-readable storage medium are also provided.

18 Claims, 10 Drawing Sheets

A network device sends first configuration information to a terminal, and the terminal receives the first configuration information sent by the network device, the first configuration information being used for determining at least one first PO, each of the at least one first PO being associated with at least one second PO, and the first PO and the second PO being used for transmitting scheduling information of a paging message

301

(56) References Cited

OTHER PUBLICATIONS

3rd Generation Partnership Project; "Technical Specification Group Radio Access Network; NR; User Equipment (UE) procedures in Idle mode and RRC Inactive state (Release 15)", 3GPP TS 38.304 V15.2.0 (Dec. 2018). 28 pages.
Intel Corporation, "Paging enhancement for NR-U", 3GPP TSG-RAN WG2 105 R2-1900720, Athens, Greece, Feb. 25-Mar. 1, 2019. 3 pages.
LG Electronics Inc, "Paging enhancements in NR Unlicensed band", 3GPP TSG-RAN WG2#104 R2-1816446, Spokane, USA, Nov. 12-16, 2018. 3 pages.
Samsung, "Extended PO for Paging in NR-U", 3GPP TSG-RAN2 105 R2-1900131, Athens, Greece, Feb. 25-Mar. 1, 2019. 3 pages.
Samsung, "Multiple POs for Paging in NR-U", 3GPP TSG-RAN2 105 R2-1900135, Athens, Greece, Feb. 25-Mar. 1, 2019. 3 pages.
Supplementary European Search Report in the European application No. 19921531.0, dated Feb. 8, 2022. 20 pages.
Written Opinion of the International Search Authority in the international application No. PCT/CN2019/079573, dated Dec. 9, 2019. 8 pages with English translation.
First Office Action of the European application No. 19921531.0, dated Nov. 8, 2022. 8 pages.
Oral Proceedings of the European application No. 19921531.0, dated May 3, 2023. 13 pages.
First Office Action of the Chinese application No. 202110419202.X, dated Aug. 12, 2022 with English translation (24 pages).
3GPP TS 38.300 V16.2.0 (Jul. 2020), 3rd Generation Partnership Project; Technical Specification Group Radio Access Network; NR; NR and NG-RAN Overall Description; Stage 2 (Release 16).
3GPP TS 38.304 V16.2.0 (Sep. 2020), 3rd Generation Partnership Project; Technical Specification Group Radio Access Network; NR; User Equipment (UE) procedures in Idle mode and RRC Inactive state (Release 16).
3GPP TS 38.331 V16.2.0 (Sep. 2020), 3rd Generation Partnership Project; Technical Specification Group Radio Access Network; NR; Radio Resource Control (RRC) protocol specification (Release 16).
International Search Report in the international application No. PCT/CN2019/079573, dated Dec. 9, 2019.
"3rd Generation Partnership Project; Technical Specification Group Radio Access Network; NR; Multiplexing and channel coding (Release 15)",3GPP Standard; Technical Specification; 3GPP TS 38.212, vol. RAN WG1, No. V15.4.0, Dec. 2018, pp. 8-94, 100 pages.
Telephone Consultation of the European application No. 19921531.0, issued on Oct. 9, 2023, 10 pages.
Result of consultation of the European application No. 19921531.0, issued on Oct. 17, 2023, 12 pages.

\* cited by examiner

A network device sends first configuration information to a terminal, and the terminal receives the first configuration information sent by the network device, the first configuration information being used for determining at least one first PO, each of the at least one first PO being associated with at least one second PO, and the first PO and the second PO being used for transmitting scheduling information of a paging message — 301

FIG. 3

METHOD FOR CONFIGURING PAGING OCCASION, TERMINAL, AND NON-TRANSITORY COMPUTER-READABLE STORAGE MEDIUM

CROSS-REFERENCE TO RELATED APPLICATION

This application is a U.S. continuation application of International Application No. PCT/CN2019/079573, entitled "METHOD AND APPARATUS FOR CONFIGURING PAGING OCCASION, AND TERMINAL AND NETWORK DEVICE", filed on Mar. 25, 2019, the disclosure of which is hereby incorporated by reference in its entirety.

TECHNICAL FIELD

The present disclosure relate to the technical field of mobile communications, and more particularly to a method for configuring a Paging Occasion (PO), a terminal and a non-transitory computer-readable storage medium.

BACKGROUND

Scheduling information of a paging message, i.e., paging Downlink Control Information (DCI) is transmitted in a PO.

In a New Radio-Unlicensed (NR-U) system, a New Radio (NR) cell will be deployed on an unlicensed spectrum. To send the paging DCI, a base station needs to preempt a channel first, that is, perform Listen Before Talk (LBT). If the base station fails to preempt a channel, it cannot send the paging DCI. In this case, the base station needs to wait until the next PO to send the paging DCI, which increases a paging delay and affects service performance and user experience.

SUMMARY

The aspects of the present disclosure provide a method for configuring a PO, a terminal, and a non-transitory computer-readable storage medium.

In a first aspect, a method for configuring a PO provided, which includes that: a terminal receives first configuration information sent by a network device, the first configuration information being used for determining at least one first PO, each of the at least one first PO being associated with at least one second PO, and the first PO and the second PO being used for transmitting scheduling information of a paging message.

In a second aspect, a terminal is provided, which includes a transceiver, configured to receive first configuration information sent by a network device, the first configuration information being used for determining at least one first PO, each of the at least one first PO being associated with at least one second PO, and the first PO and the second PO being used for transmitting scheduling information of a paging message.

In a third aspect, a non-transitory computer-readable storage medium is provided, which is configured to store a computer program, the computer program causing a computer to perform the method for configuring a PO in the first aspect.

BRIEF DESCRIPTION OF THE DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings:

FIG. 3 is a flowchart of a method for configuring a PO according to an embodiment of the present disclosure;

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fall within the scope of protection of the present disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system or a 5G system.

Figure 1:
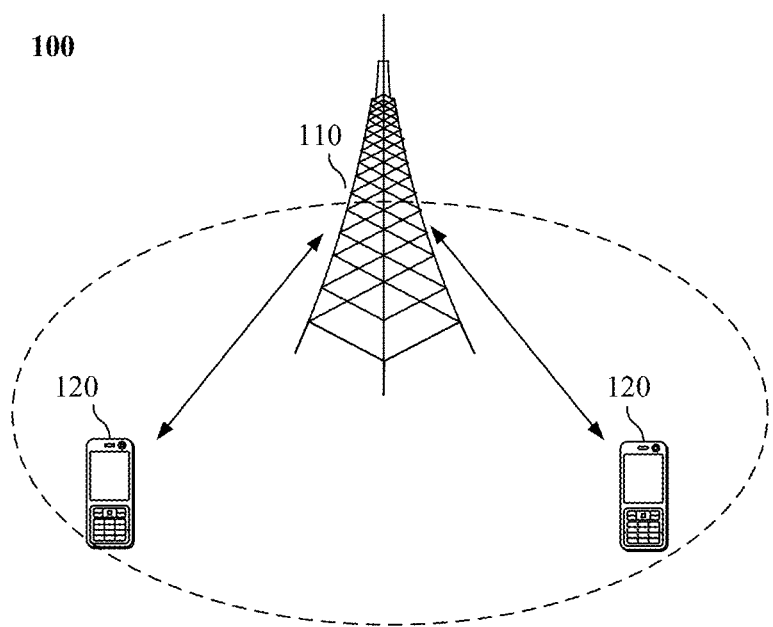
FIG. 1 is a schematic diagram of a communication system architecture according to an embodiment of the present disclosure.

Exemplarily, a communication system 100 that the embodiments of the present disclosure are applied to is illustrated in FIG. 1. The communication system 100 may include a network device 110, and the network device 110 may be a device that communicates with a terminal 120 (or called a communication terminal and a terminal). The network device 110 may provide communication coverage for a specific geographical region and may communicate with a terminal under the coverage. Optionally, the network device 110 may be a Base Transceiver Station (BTS) in the GSM or the CDMA system, a NodeB (NB) in the WCDMA system, an Evolutional Node B (eNB or eNodeB) in the LTE system, or a wireless controller in a Cloud Radio Access Network (CRAN). Or the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal 120 located within the coverage of the network device 110. The "terminal" used herein includes, but is not limited to, a device configured to receive/send a communication signal through a wired line connection, for example, through Public Switched Telephone Network (PSTN), Digital Subscriber Line (DSL), digital cable and direct cable connections, and/or another data connection/network) and/ or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal, and/or an Internet of Things (IoT) device. The terminal configured to communicate through a wireless interface may be called a "wireless communication terminal", a "wireless terminal" or a "mobile terminal." Examples of the mobile terminal include, but is not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal in the 5G network, a terminal in the future evolved PLMN or the like.

Optionally, Device to Device (D2D) communication may be performed between the terminals 120.

Optionally, the 5G system or the 5G network may also be called an NR system or an NR network.

A network device and two terminals are exemplarily illustrated in FIG. 1. Optionally, the communication system 100 may include multiple network devices and another number of terminals may be included in coverage of each network device. There are no limits made thereto in the embodiments of the present disclosure.

Optionally, the communication system 100 may further include other network entities such as a network controller and a mobility management entity. No limits are made thereto in the embodiments of the present disclosure.

It is to be understood that a device with a communication function in the network/system in the embodiments of the present disclosure may be called a communication device. For example, for the communication system 100 illustrated in FIG. 1, communication devices may include the network device 110 and terminal 120 with communication functions, and the network device 110 and the terminal 120 may be the specific devices mentioned above and will not be elaborated herein. The communication devices may further include other devices in the communication system 100, for example, other network entities like a network controller and a mobility management entity. There are no limits made thereto in the embodiments of the present disclosure.

For the convenience of understanding the technical solutions in the embodiments of the present disclosure, the relevant technologies of the embodiments of the present disclosure are described below.

1. Beam

Figure 2:
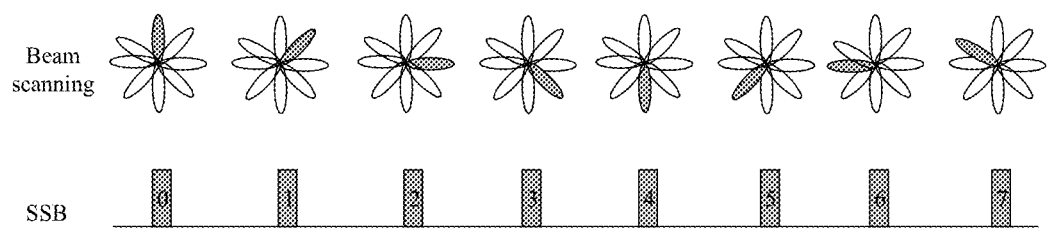
FIG. 2 is a schematic diagram of a beam according to an embodiment of the present disclosure.

NR will be deployed on high frequencies in the future. In order to improve coverage, 5G meets the requirement for coverage (space for coverage, time for space) by introducing the mechanism of beam sweeping. With reference to FIG. 2, after the beam sweeping is introduced, it is necessary to send synchronization signals in every beam direction. The synchronization signal of 5G is given in the form of a Synchronization Signal/Physical Broadcast Channel Block (SS/ PBCH Bblock, called as SSB for short). The SSB includes a Primary Synchronization Signal (PSS), a Secondary Synchronization Signal (SSS) and a Physical Broadcast Channel (PBCH). The synchronization signal of 5G appears periodically in the time domain in the form of SS burst set. The number of beams actually transmitted in each cell is determined by a network side configuration, but the frequency of the cell determines the maximum number of beams that can be configured.

2. Paging

Similar to LTE, the UE of 5G is first attached to the core network for registration, and then there is context information of the UE at the core network, one of which is location area information, that is, a Tracking Area (TA) list. When a paging of the UE exists, the core network sends paging messages to all base stations included in the TA list of the UE and triggers these base stations to send paging to the UE in all cells under the base stations. So a paging range of a UE at least includes all cells in one TA range.

In 5G, because the cell adopts a multi-beam form, the paging message must be sent under each beam of each cell in order to page to the UE. For a cell deployed on high frequencies, there are more beams, such as 64 beams, so paging in a cell is sent 64 times. This increases the signaling load on the network. Scheduling information of the paging message is scrambled through a Paging-Radio Network Temporary Identifier (P-RNTI), which is unique throughout the network. A paging message may carry paging of up to 32 UEs. In the paging message, a paged UE is identified by S-TMSI. Therefore, the UE always monitors the PDCCH scrambled by the P-RNTI in its own PO, obtains a Physical Downlink Shared Channel (PDSCH) that carries the paging message, and then obtains the paging message and decodes the paging message to obtain the identifier of the paged UE from the paging message, so as to determine whether there is a paging identifier matching with its own identifier. If so, the UE itself is paged; or else, it means that the paging message is not its own.

To obtain the paging message, the UE first calculates a PO, in which paging scheduling information, i.e., paging DCI is transmitted. The embodiments of the present disclosure provide a method for increasing the PO, which may improve the transmission reliability of a paging message.

FIG. 3 is a flowchart of a method for configuring a PO according to an embodiment of the disclosure. As illustrated in FIG. 3, the method for configuring the PO may include the following operations.

In 301, a network device sends first configuration information to a terminal, and the terminal receives the first configuration information sent by the network device. The first configuration information is used for determining at least one first paging occasion (PO), each of the at least one first PO is associated with at least one second PO, and the first PO and the second PO are used for transmitting scheduling information of a paging message.

In the embodiments of the present disclosure, the network device may be a base station, for example, a 4G base station (i.e., eNB), or a 5G base station (i.e., gNB).

In the embodiments of the present disclosure, the terminal may be any device capable of communicating with the network, such as a mobile phone, a laptop, a tablet computer, a vehicle terminal, and a wearable device.

In an implementation of the present disclosure, the network device configures paging-related parameters through system broadcasting. Specifically, Table 1 and Table 2 show the contents of the first configuration information, in which at least one first PO is configured.

TABLE 1

```
PCCH-Config ::=                SEQUENCE {
    defaultPagingCycle                           PagingCycle,
    nAndPagingFrameOffset                        CHOICE {
        oneT                                         NULL,
        halfT                                        INTEGER (0..1),
        quarterT                                     INTEGER (0..3),
        oneEighthT                                   INTEGER (0..7),
        oneSixteenthT                                INTEGER (0..15)
    },
    ns                                           ENUMERATED {four, two, one},
    firstPDCCH-MonitoringOccasionOfPO            CHOICE {
        sCS15KHZoneT                                                        SEQUENCE
(SIZE (1..maxPO-perPF)) OF INTEGER (0..139),
        sCS30KHZoneT-SCS15KHZhalfT                                          SEQUENCE
(SIZE (1..maxPO-perPF)) OF INTEGER (0..279),
        sCS60KHZoneT-5C530KHZhalfT-SCS15KHZquarterT                         SEQUENCE
(SIZE (1..maxPO-perPF)) OF INTEGER (0..559),
        sCS120KHZoneT-SCS60KHZhalfT-SCS30KHZquarterT-SCS15KHZoneEighthT
SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT
SEQUENCE (SIZE (1..maxPO-perPF)) OF INTEGER (0..2239),
        sCS120KHZquarterT-5C560KHZoneEighthT-5C530KHZoneSixteenthT
SEQUENCE (SIZE (1..maxPO-perPF)) OF INTEGER (0..4479),
        sCS120KHZoneEighthT-SCS60KHZoneSixteenthT
SEQUENCE (SIZE (1..maxPO-perPF)) OF INTEGER (0..8959),
        sCS120KHZoneSixteenthT
SEQUENCE (SIZE (1..maxPO-perPF)) OF INTEGER (0..17919)
    } OPTIONAL,  -- Need R
    ...
}
```

TABLE 2

```
- - ASN1START
- - TAG-PDCCH-CONFIGCOMMON-START
PDCCH-ConfigCommon ::=          SEQUENCE {
    controlResourceSetZero                       ControlResourceSetZero
OPTIONAL, -- Cond InitialBWP-Only
    commonControlResourceSet                     ControlResourceSet
OPTIONAL, -- Need R
    searchSpaceZero                              SearchSpaceZero
OPTIONAL, -- Cond InitialBWP-Only
    commonSearchSpaceList                        SEQUENCE (SIZE(1..4)) OF SearchSpace
OPTIONAL, -- Need R
    searchSpaceSIB1                              SearchSpaceId
OPTIONAL, -- Need S
    searchSpaceOtherSystemInformation            SearchSpaceId
OPTIONAL, -- Need S
    pagingSearchSpace                            SearchSpaceId
OPTIONAL, -- Need S
    ra-SearchSpace                               SearchSpaceId
OPTIONAL, -- Need S
    ...,
    [[
    firstPDCCH-MonitoringOccasionOfPO            CHOICE {
        sCS15KHZoneT SEQUENCE (SIZE
(1..maxPO-perPF)) OF INTEGER (0..139),
        sCS30KHZoneT-SCS15KHZhalfT                                          SEQUENCE (SIZE
(SIZE (1..maxPO-perPF)) OF INTEGER (0..279),
        sCS60KHZoneT-SCS30KHZhalfT-SCS15KHZquarterT                         SEQUENCE
(SIZE (1..maxPO-perPF)) OF INTEGER (0..559),
        sCS120KHZoneT-SCS60KHZhalfT-SCS30KHZquarterT-SCS15KHZoneEighthT     SEQUENCE
(SIZE (1..maxPO-perPF)) OF INTEGER (0..1119),
        sCS120KHZhalfT-SCS60KHZquarterT-SCS30KHZoneEighthT-SCS15KHZoneSixteenthT
```

TABLE 2-continued

```
SEQUENCE (SIZE (1..maxPO-perPF)) OF INTEGER (0..2239),
    sCS120KHZquarterT-SCS6OKHZoneEighthT-SCS30KHZoneSixteenthT            SEQUENCE
(SIZE (1..maxPO-perPF)) OF INTEGER (0..4479),
    sCS120KHZoneEighthT-SCS60KHZoneSixteenthT                             SEQUENCE
(SIZE (1..maxPO-perPF)) OF INTEGER (0..8959),
    sCS120KHZoneSixteenthT                                                SEQUENCE
(SIZE (1..maxPO-perPF)) OF INTEGER (0..17919)
    }
OPTIONAL -- Cond OtherBWP
  ]]
}
- - TAG-PDCCH-CONFIGCOMMON-STOP
-- ASN1STOP
```

In the embodiments of the present disclosure, in addition to the first PO, the network device also configures an additional second PO. Each first PO is associated with at least one second PO. The first PO and the second PO are used for transmitting the scheduling information of the paging message.

In the embodiments of the present disclosure, the second PO associated with the first PO may be configured in any of the following manners.

First manner: the first configuration information includes first information. The first information indicates the number of second POs associated with the first PO. The correspondences between the second POs and PDCCH occasions are predefined through a protocol.

In the embodiments of the present disclosure, the first PO is an existing PO, and the second PO is the additional configured PO. The first PO may be called an associated PO, and the second PO may be called an additional PO. Here, the number of POs may be directly configured in the first configuration information, and the correspondence between each additional PO and a respective PDCCH occasion may be specified in the protocol. For example, the number of additional POs may be configured as 4. The correspondence between each additional PO and a respective PDCCH occasion is determined in the following ways.

1.1) The number of first POs configured in the first configuration information is M, and the number of second POs associated with each first PO is N.

A starting PDCCH occasion of the (i_s+1)-th first PO among the M first POs is a first PDCCH occasion, and a starting PDCCH occasion of the m-th second PO among N second POs associated with the (i_s+1)-th first PO is a second PDCCH occasion; and a deviation between the second PDCCH occasion and the first PDCCH occasion is m*S PDCCH occasions, where $1 \leq i\_s+1 \leq M$, $1 \leq m \leq N$, S is a number of SSBs actually transmitted, and M, N, i_s+1, m and S are positive integers.

For example, N is equal to 4, and the deviation between the starting PDCCH occasion of the associated PO and the starting PDCCH occasion of the m-th ($1 \leq m \leq 4$) additional PO is m*S PDCCH occasions. S is the number of actually transmitted SSBs.

It is to be noted that the associated PO is a PO that exists before the additional PO is configured. The additional PO will be associated with an existing PO.

In the above solution, the starting PDCCH occasion (that is, the first PDCCH occasion) of the (i_s+1)-th first PO may be determined in any of the following ways.

A) When the first configuration information includes second information, the first PDCCH occasion is determined based on the second information, the second information indicating a respective starting PDCCH occasion corresponding to each of the M first POs.

Here, the second information may be firstPDCCH-MonitoringOccasionOfPO. If the first configuration information is configured with firstPDCCH-MonitoringOccasionOfPO, then an index number of the starting PDCCH occasion of the (i_s+1)-th first PO is:

the (i_s+1)-th value in firstPDCCH-MonitoringOccasionOfPO.

The configuration of firstPDCCH-MonitoringOccasionOfPO is given in Table 3 below.

TABLE 3

```
PCCH-Config ::=                                      SEQUENCE {
    defaultPagingCycle                                   PagingCycle,
    nAndPagingFrameOffset                                CHOICE {
        oneT                                                 NULL,
        halfT                                                INTEGER (0..1),
        quarterT                                             INTEGER (0..3),
        oneEighthT                                           INTEGER (0..7),
        oneSixteenthT                                        INTEGER (0..15)
    },
    ns                                                   ENUMERATED {four, two, one},
    firstPDCCH-MonitoringOccasionOfPO                    CHOICE {
        sCS15KHZoneT                                                             SEQUENCE (SIZE
(1..maxPO-perPF)) OF INTEGER (0..139),
        sCS30KHZoneT-SCS15KHZhalfT                                               SEQUENCE
(SIZE (1..maxPO-perPF)) OF INTEGER (0..279),
        sCS60KHZoneT-SCS30KHZhalfT-SCS15KHZquarterT                              SEQUENCE
(SIZE (1..maxPO-perPF)) OF INTEGER (0..559),
            sCS120KHZoneT-SCS60KHZhalfT-SCS30KHZquarterT-SCS15KHZoneEighthT      SEQUENCE
(SIZE (1..maxPO-perPF)) OF INTEGER (0..1119),
            sCS120KHZhalfT-SCS60KHZquarterT-SCS30KHZoneEighthT-SCS15KHZoneSixteenthT
SEQUENCE (SIZE (1..maxPO-perPF)) OF INTEGER (0..2239),
```

TABLE 3-continued

| | |
|---|---|
| sCS120KHZquarterT-SCS60KHZoneEighthT-5C530KHZoneSixteenthT (SIZE (1..maxPO-perPF)) OF INTEGER (0..4479), | SEQUENCE |
| sCS120KHZoneEighthT-SCS60KHZoneSixteenthT (SIZE (1..maxPO-perPF)) OF INTEGER (0..8959), | SEQUENCE |
| sCS120KHZoneSixteenthT (SIZE (1..maxPO-perPF)) OF INTEGER (0..17919) } OPTIONAL -- Need R | SEQUENCE |
| numberOfPO ... } | INTEGER (1..4) |

B) When the first configuration information does not include the second information, the index number of the first PDCCH occasion is i_s*S*(N+1).

Here, the second information may be firstPDCCH-MonitoringOccasionOfPO. If the first configuration information is not configured with firstPDCCH-MonitoringOccasionOfPO, then the index number of the starting PDCCH occasion of the (i_s+1)-th first PO is: i_s*S*(N+1).

1.2) The number of first POs configured in the first configuration information is M, and the number of second POs associated with each first PO is N; a starting PDCCH occasion of the (i_s+1)-th first PO among the M first POs is the first PDCCH occasion, and a starting PDCCH occasion of the m-th second PO among N second POs associated with the (i_s+1)-th first PO is the second PDCCH occasion; and the index number of the second PDCCH occasion is M*S*m+i_s*S, where 1≤i_s+1≤M, 1≤m≤N, S is the number of SSBs actually transmitted, and M, N, i_s+1, m and S are positive integers.

1.3) The number of first POs configured in the first configuration information is M, and the number of second POs associated with each first PO is N; a starting PDCCH occasion of the (i_s+1)-th first PO among the M first POs is the first PDCCH occasion, and a starting PDCCH occasion of the m-th second PO among N second POs associated with the (i_s+1)-th first PO is the second PDCCH occasion.

The index number of the second PDCCH occasion is determined based on third information, the third information indicating a respective starting PDCCH occasion corresponding to each of the N second POs associated with the (i_s+1)-th first PO; or, the index number of the second PDCCH occasion is determined based on fourth information, the fourth information indicating a starting PDCCH occasion of the (m')-th second PO among the N second POs associated with the (i_s+1)-th first PO, where 1≤m'≤N, m'≠m, and m' is a positive integer. Further, the starting PDCCH occasion of the (m')-th second PO is a third PDCCH occasion, and a deviation between the second PDCCH occasion and the third PDCCH occasion is |m'-m|*S PDCCH occasions.

In specific implementation, the network device may configure a respective firstPDCCH-MonitoringOccasionOfPO parameter for each additional PO of the associated PO in the first configuration information. The firstPDCCH-MonitoringOccasionOfPO parameter indicates a location of a starting PDCCH occasion of the additional PO. Alternatively, the network device may configure one firstPDCCH-MonitoringOccasionOfPO parameter for all the additional POs of the associated PO, and the firstPDCCH-MonitoringOccasionOfPO parameter indicates a location of a starting PDCCH occasion of a certain additional PO (for example, the first additional PO). There is a deviation of k*S PDCCH occasions between a location of a staring PDCCH occasion of another additional PO and the location of the PDCCH occasion of the first additional PO. K is the index number of the additional PO, starting at 1. S is the number of SSBs actually transmitted.

Second manner: the first configuration information includes fifth information, the fifth information indicating a respective search space corresponding to each of at least one second PO associated with the first PO.

Here, the network device may configure an independent searchspace for the additional PO in the first configuration information. Each searchspace in a searchspace list corresponds to a respective additional PO. Further, a correspondence between each additional PO and a respective PDCCH occasion is determined in the following ways.

2.1) There is no interval slot or interval PDCCH occasion between the first PO and any two adjacent POs among the at least one second PO.

Here, the interval PDCCH occasion is a PDCCH occasion that does not belong to any PO between an ending of one PO and a starting of another PO, and the PDCCH occasion is in a search space where the second PO is located.

For example, the first PDCCH occasion at the beginning of the next slot of the last slot, where the associated PO is, is the starting PDCCH occasion of the additional first PO. The second PDCCH occasion at the beginning of the next slot of the last slot of the first additional PO is the starting PDCCH occasion of the additional second PO, and so on.

It is to be noted that the first PDCCH occasion of the first second PO is searched from the next slot of the slot corresponding to the ending position of the first PO. This PDCCH occasion does not have to be in the next slot.

2.2) There is a first interval between the first PO and any two adjacent POs among the at least one second PO. The first interval includes:

a number of interval slots or a number of interval PDCCH occasions between an ending slot of a former PO and a starting slot of a latter PO among the adjacent POs; or, a number of interval slots or a number of interval PDCCH occasions between a starting slot of a former PO and a starting slot of a latter PO among the adjacent POs.

2.3) there is the second interval between the first PO and the target second PO among the at least one second PO. The second interval refers to:

the number of interval slots or the number of interval PDCCH occasions between the starting slot of the first PO and the starting slot of the target second PO; or, the number of interval slots or the number of interval PDCCH occasions between the ending slot of the first PO and the starting slot of the target second PO.

In the above solution, the starting PDCCH occasion of the second PO is the first PDCCH occasion of the starting slot of the second PO.

In specific implementation, the independent searchspace for the additional PO and the deviation between the additional PO and the associated PO may be configured through Table 4 below.

deviation between the second PDCCH occasion and the third PDCCH occasion is |m'-m|*S PDCCH occasions.

In the embodiments of the present disclosure, for that a first PO and all the second POs associated with the first

TABLE 4

```
PDCCH-ConfigCommon ::=              SEQUENCE {
  controlResourceSetZero            ControlResourceSetZero
OPTIONAL, -- Cond InitialBWP-Only
  commonControlResourceSet          ControlResourceSet
OPTIONAL, -- Need R
  searchSpaceZero                   SearchSpaceZero
OPTIONAL, -- Cond InitialBWP-Only
  commonSearchSpaceList             SEQUENCE (SIZE(1..4)) OF SearchSpace
OPTIONAL, -- Need R
  searchSpaceSIB1                   SearchSpaceId
OPTIONAL, -- Need S
  searchSpaceOtherSystemInformation SearchSpaceId
OPTIONAL, -- Need S
  pagingSearchSpace                 SearchSpaceId
OPTIONAL, -- Need S
  extraPagingSearchSpace              SEQUENCE (SIZE(1..4)) OF ExtraSearchSpace,
  ra-SearchSpace                    SearchSpaceId
OPTIONAL, -- Need S
  ...,
  [[
  firstPDCCH-MonitoringOccasionOfPO   CHOICE {
    sCS15KHZoneT                                          SEQUENCE (SIZE
(1..maxPO-perPF)) OF INTEGER (0..139),
    sCS30KHZoneT-SCS15KHZhalfT                            SEQUENCE (SIZE
(1..maxPO-perPF)) OF INTEGER (0..279),
    sCS60KHZoneT-SCS30KHZhalfT-SCS15KHZquarterT                SEQUENCE
(SIZE (1..maxPO-perPF)) OF INTEGER (0..559),
    sCS120KHZoneT-SCS60KHZhalfT-SCS30KHZquarterT-SCS15KHZoneEighthT      SEQUENCE
(SIZE (1..maxPO-perPF)) OF INTEGER (0..1119),
    sCS120KHZhalfT-SCS60KHZquarterT-SCS30KHZoneEighthT-SCS15KHZoneSixteenthT   SEQUENCE
(SIZE (1..maxPO-perPF)) OF INTEGER (0..2239),
    sCS120KHZquarterT-5C560KHZoneEighthT-5C530KHZoneSixteenthT        SEQUENCE
(SIZE (1..maxPO-perPF)) OF INTEGER (0..4479),
    sCS120KHZoneEighthT-5C560KHZoneSixteenthT                 SEQUENCE
(SIZE (1..maxPO-perPF)) OF INTEGER (0..8959),
    sCS120KHZoneSixteenthT                                SEQUENCE (SIZE
(1..maxPO-perPF)) OF INTEGER (0..17919)
  }
OPTIONAL -- Cond OtherBWP
  ]]
  ExtraSearchSpace=                 SEQUENCE {
  PagingSearchSpace                 SearchSpace,
  Offset                            INTEGER (0..20) ----For example, a maximum of 20
slot offets
  }
}
- - TAG-PDCCH-CONFIGCOMMON-STOP
-- ASN1STOP
```

2.4) The number of first POs configured in the first configuration information is M, and the number of second POs associated with each first PO is N; a starting PDCCH occasion of the (i_s+1)-th first PO among the M first POs is the first PDCCH occasion, and a starting PDCCH occasion of the m-th second PO among N second POs associated with the (i_s+1)-th first PO is the second PDCCH occasion.

The index number of the second PDCCH occasion is determined based on third information, the third information indicating a respective starting PDCCH occasion corresponding to each of the N second POs associated with the (i_s+1)-th first PO; or, the index number of the second PDCCH occasion is determined based on fourth information, the fourth information indicating a starting PDCCH occasion of the (m')-th second PO among the N second POs associated with the (i_s+1)-th first PO, where 1<m'≤N, m'≠m, and m' is a positive integer. Further, a starting PDCCH occasion of the (m')-th second PO is a third PDCCH occasion, and a PO are used for transmitting the paging DCI, in an application scenario, the first PO and at least one second PO associated with the first PO are used for respectively transmitting different scheduling information. In another application scenario, both the first PO and the at least one second PO associated with the first PO transmit the same scheduling information.

Figure 4A:
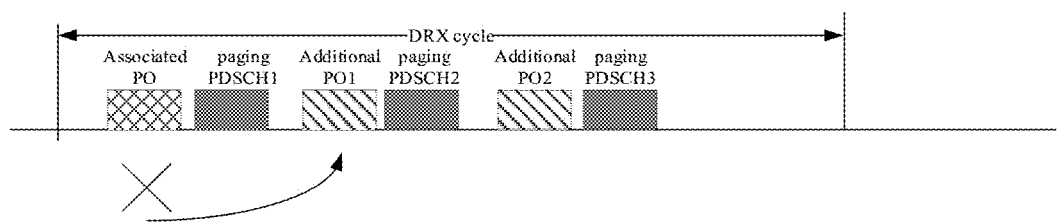
FIG. 4A is a first schematic diagram of a PO according to an embodiment of the present disclosure.

For example, with reference to FIG. 4A, the associated PO has an association with the additional PO1 and the additional PO2. The associated PO transmits the scheduling information of paging PDSCH1, the additional PO1 transmits the scheduling information of paging PDSCH2, and the additional PO2 transmits the scheduling information of paging PDSCH3. It is to be noted that, the paging DCI is sent in the PO, at the same time, a resource location of paging PDSCH is allocated to a location near the PO and notified to a user through the paging DCI, so as to ensure that both the paging DCI and paging PDSCH are able to be sent in a channel preempting process.

Figure 4B:
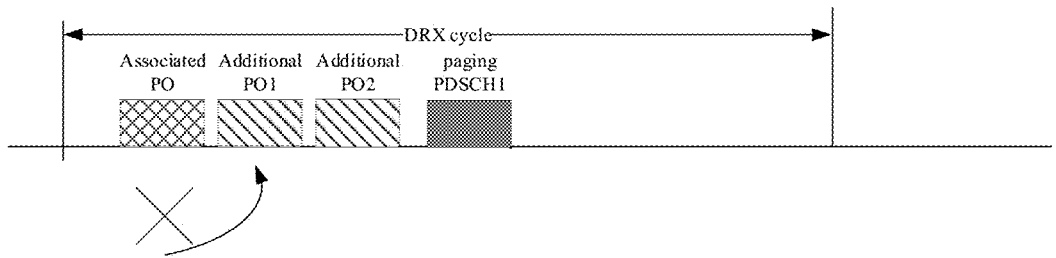
FIG. 4B is a second schematic diagram of a PO according to an embodiment of the present disclosure.

For example, with reference to FIG. 4B, the associated PO has an association with the additional PO1 and the additional PO2. The associated PO, the additional PO1 and the additional PO2 all transmit the scheduling information of paging PDSCH1.

The above solution provides a method for configuring the additional PO. Behaviors of the terminal and the network device implemented based on the configuration of the additional PO are respectively described below.

1. Behavior of Terminal Side

The terminal detects the scheduling information of the paging message in the first PO; if no scheduling information of the paging message is detected by the terminal in the first PO, the terminal detects the scheduling information of the paging message in a next second PO associated with the first PO; and if the scheduling information of the paging message is detected by the terminal in the first PO, the terminal stops detecting all the second POs associated with the first PO.

Further, if the terminal does not detect the scheduling information of the paging message in the i-th second PO associated with the first PO, then it detects the scheduling information of the paging message in the (i+1)-th second PO associated with the first PO, where i is a positive integer; if the terminal detects the scheduling information of the paging message in the i-th second PO associated with the first PO, then it stops detecting all the second POs after the i-th second PO associated with the first PO.

For example, the UE receives system broadcast information to obtain the paging-related configuration information. If the configuration information of the additional PO is configured, the UE detects the paging DCI at the location of the first PO. If no paging DCI is detected, it continues to detect the paging DCI at the location of the next associated additional PO. If the paging DCI is detected by the UE, the UE stops detecting other associated additional POs.

2. Behavior of Network Device Side

The network device preempts a channel for the available PO in a discontinuous reception (DRX) cycle; if the network device succeeds in preempting a channel for the available PO, it send the scheduling information of the paging message in the available PO, and stops sending the scheduling information of the paging message in other available POs after this available PO; and if the network device fails to preempt a channel for the available PO, it continues to preempt a channel for a first available PO after this available PO. The available PO is the first PO or the second PO associated with the first PO.

For example, the network device preempts the channel before the original PO. If the network device succeeds in preempting the channel, it sends the paging DCI in the PO. If the network device fails to preempt the channel, it does not send the paging DCI, and continues to preempt the channel before the location of the next additional PO. If the network device sends the paging DCI successfully, then it does not continue sending the paging DCI in an unused PO; or else, it continues to preempt the channel.

In an implementation, if the network device fails to preempt a channel for any available PO in the DRX cycle, the network device sends a paging failure message to a core network.

In an implementation, if the network device fails to preempt a channel for any available PO in the DRX cycle, the network device cancels the transmission of the scheduling information of the paging message.

In an implementation, if the network device fails to preempt a channel for any available PO in the DRX cycle, the network device continues to preempt a channel for an available PO in a next DRX cycle. Here, the network device obtains first indication information from the core network. The first indication information indicates that the network device can send the scheduling information of the paging message in T DRX cycles, where T is a positive integer. If the network device fails to preempt a channel in any of the T DRX cycles, then it sends a paging failure message to the core network.

Figure 5:
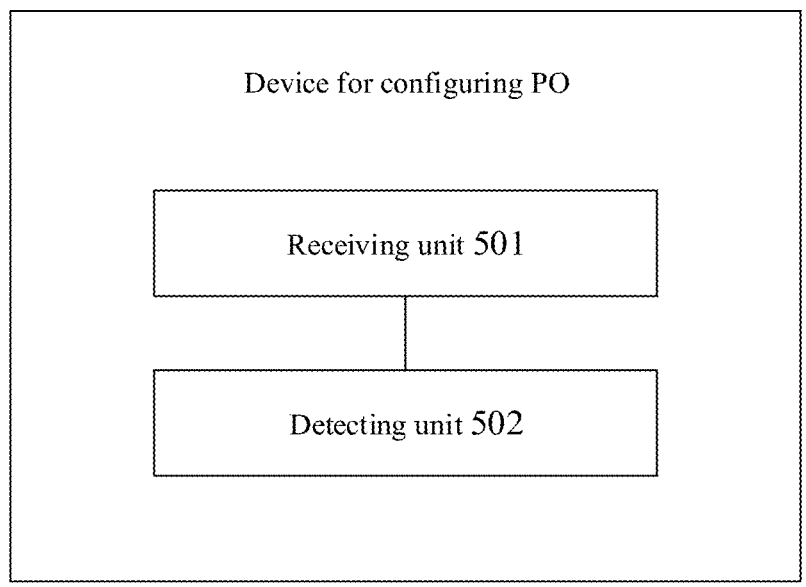
FIG. 5 is a first structural schematic diagram of an apparatus for configuring a PO according to an embodiment of the present disclosure.

FIG. 5 is a first structural schematic diagram of an apparatus for configuring a PO according to an embodiment of the present disclosure. The apparatus for configuring a PO is applied to a terminal. As illustrated in FIG. 5, the apparatus for configuring a PO includes a receiving unit 501.

The receiving unit 501 is configured to receive the first configuration information sent by the network device. The first configuration information is used for determining at least one first PO, each of the at least one first PO is associated with at least one second PO, and the first PO and the second PO are used for transmitting scheduling information of a paging message.

In an implementation, the first configuration information includes first information indicating a number of second POs associated with the first PO, and correspondences between the second POs and Physical Downlink Control Channel (PDCCH) occasions are predefined through a protocol.

In an implementation, a number of first POs configured in the first configuration information is M, and a number of second POs associated with each first PO is N.

A starting PDCCH occasion of the (i_s+1)-th first PO among the M first POs is a first PDCCH occasion, and a starting PDCCH occasion of the m-th second PO among N second POs associated with the (i_s+1)-th first PO is a second PDCCH occasion.

A deviation between the second PDCCH occasion and the first PDCCH occasion is m*S PDCCH occasions, where 1≤i_s+1≤M, 1≤m≤N, S is a number of SSBs actually transmitted, and M, N, i_s+1, m and S are positive integers.

In an implementation, when the first configuration information includes second information, the first PDCCH occasion is determined based on the second information, the second information indicating a respective starting PDCCH occasion corresponding to each of the M first POs.

In an implementation, when the first configuration information does not include the second information, an index number of the first PDCCH occasion is i_s*S*(N+1).

In an implementation, the number of first POs configured in the first configuration information is M, and the number of second POs associated with each first PO is N.

The starting PDCCH occasion of the (i_s+1)-th first PO among the M first POs is the first PDCCH occasion, and the starting PDCCH occasion of the m-th second PO among N second POs associated with the (i_s+1)-th first PO is the second PDCCH occasion.

The index number of the second PDCCH occasion is M*S*m+i_s*S, where 1≤i_s+1≤M, 1≤m≤N, S is the number of SSBs actually transmitted, and M, N, i_s+1, m and S are positive integers.

In an implementation, the number of first POs configured in the first configuration information is M, and the number of second POs associated with each first PO is N.

The starting PDCCH occasion of the (i_s+1)-th first PO among the M first POs is the first PDCCH occasion, and the starting PDCCH occasion of the m-th second PO among N second POs associated with the (i_s+1)-th first PO is the second PDCCH occasion.

The index number of the second PDCCH occasion is determined based on third information, the third information indicating a respective starting PDCCH occasion corresponding to each of the N second POs associated with the (i_s+1)-th first PO.

Alternatively, the index number of the second PDCCH occasion is determined based on fourth information, the fourth information indicating a starting PDCCH occasion of the (m')-th second PO among the N second POs associated with the (i_s+1)-th first PO, where 1≤m'≤N, m'≠m, and m' is a positive integer.

In an implementation, the starting PDCCH occasion of the (m')-th second PO is a third PDCCH occasion.

A deviation between the second PDCCH occasion and the third PDCCH occasion is |m'-m|*S PDCCH occasions.

In an implementation, the first configuration information includes fifth information, the fifth information indicating a respective search space corresponding to each of at least one second PO associated with the first PO.

In an implementation, there is no interval slot or interval PDCCH occasion between the first PO and any two adjacent POs among the at least one second PO.

In an implementation, there is a first interval between the first PO and any two adjacent POs among the at least one second PO.

In an implementation, the first interval includes one of:
a number of interval slots or a number of interval PDCCH occasions between an ending slot of a former PO and a starting slot of a latter PO among the adjacent POs; or,
a number of interval slots or a number of interval PDCCH occasions between a starting slot of a former PO and a starting slot of a latter PO among the adjacent POs.

In an implementation, there is a second interval between the first PO and a target second PO among the at least one second PO.

In an implementation, the second interval includes one of:
a number of interval slots or a number of interval PDCCH occasions between a starting slot of the first PO and a starting slot of the target second PO; or,
a number of interval slots or a number of interval PDCCH occasions between an ending slot of the first PO and a starting slot of the target second PO.

In an implementation, the interval PDCCH occasion is a PDCCH occasion that does not belong to any PO between an ending of a PO and a starting of another PO, and the PDCCH occasion is in a search space where the second PO is located.

In an implementation, a starting PDCCH occasion of the second PO is a first PDCCH occasion of a starting slot of the second PO.

In an implementation, the number of first POs configured in the first configuration information is M, and the number of second POs associated with each first PO is N.

The starting PDCCH occasion of the (i_s+1)-th first PO among M first POs is the first PDCCH occasion, and the starting PDCCH occasion of the m-th second PO among N second POs associated with the (i_s+1)-th first PO is the second PDCCH occasion.

The index number of the second PDCCH occasion is determined based on third information, the third information indicating a respective starting PDCCH occasion corresponding to each of the N second POs associated with the (i_s+1)-th first PO; or,
the index number of the second PDCCH occasion is determined based on fourth information, the fourth information indicating a starting PDCCH occasion of the (m')-th second PO among the N second POs associated with the (i_s+1)-th first PO, where 1≤m'≤N, m'≠m, and m' is a positive integer.

In an implementation, the starting PDCCH occasion of the (m')-th second PO is a third PDCCH occasion.

The deviation between the second PDCCH occasion and the third PDCCH occasion is |m'-m|*S PDCCH occasions.

In an implementation, the first PO and the at least one second PO associated with the first PO transmit different scheduling information respectively; or
both the first PO and the at least one second PO associated with the first PO transmit the same scheduling information.

In an implementation, the apparatus may further include a detecting unit 502.

The detecting unit 502 is configured to: detect the scheduling information of the paging message in the first PO; in response to detecting no scheduling information of the paging message in the first PO, detect the scheduling information of the paging message in a next second PO associated with the first PO; and in response to determining the scheduling information of the paging message in the first PO, stop detecting all the second POs associated with the first PO.

In an implementation, the detecting unit 502 may be configured to:
when the scheduling information of the paging message is not detected in the i-th second PO associated with the first PO, detect the scheduling information of the paging message in the (i+1)-th second PO associated with the first PO, where i is a positive integer; or
when the scheduling information of the paging message is detected in the i-th second PO associated with the first PO, stop detecting all the second POs after the i-th second PO associated with the first PO.

It is understood by those skilled in the art that the related descriptions about the apparatus for configuring a PO according to the embodiments of the present disclosure may be understood with reference to the related descriptions about the method for configuring a PO according to the embodiments of the present disclosure.

Figure 6:
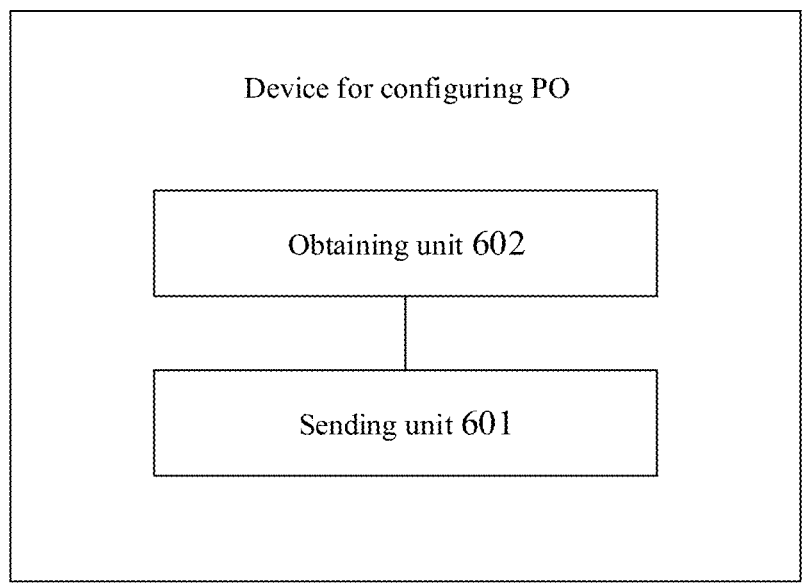
FIG. 6 is a second structural schematic diagram of an apparatus device for configuring a PO according to an embodiment of the present disclosure.

FIG. 6 is a second structural schematic diagram of an apparatus for configuring a PO according to an embodiment of the present disclosure. The apparatus for configuring a PO is applied to the network device. As illustrated in FIG. 6, the apparatus for configuring a PO may include a sending unit 601.

The sending unit 601 may be configured to send the first configuration information to a terminal, the first configuration information being used for determining at least one first PO, each of the at least one first PO being associated with at least one second PO, and the first PO and the second PO being used for transmitting scheduling information of the paging message.

In an implementation, the first configuration information includes first information indicating a number of second POs associated with the first PO, and correspondences between the second POs and PDCCH occasions are predefined through a protocol.

In an implementation, a number of first POs configured in the first configuration information is M, and a number of second POs associated with each first PO is N.

A starting PDCCH occasion of the (i_s+1)-th first PO among the M first POs is a first PDCCH occasion, and a starting PDCCH occasion of the m-th second PO among N second POs associated with the (i_s+1)-th first PO is a second PDCCH occasion.

A deviation between the second PDCCH occasion and the first PDCCH occasion is m*S PDCCH occasions, where $1 \leq i\_s+1 \leq M$, $1 \leq m \leq N$, S is a number of SSBs actually transmitted, and M, N, i_s+1, m and S are positive integers.

In an implementation, when the first configuration information includes second information, the first PDCCH occasion is determined based on the second information, the second information indicates a respective starting PDCCH occasion corresponding to each of the M first POs.

In an implementation, when the first configuration information does not include the second information, an index number of the first PDCCH occasion is i_s*S*(N+1).

In an implementation, the number of first POs configured in the first configuration information is M, and the number of second POs associated with each first PO is N.

The starting PDCCH occasion of the (i_s+1)-th first PO among the M first POs is the first PDCCH occasion, and the starting PDCCH occasion of the m-th second PO among the N second POs associated with the (i_s+1)-th first PO is the second PDCCH occasion.

An index number of the second PDCCH occasion is M*S*m+i_s*S, where $1 \leq i\_s+1 \leq M$, $1 \leq m \leq N$, S is the number of SSBs actually transmitted, and M, N, i_s+1, m and S are positive integers.

In an implementation, the number of first POs configured in the first configuration information is M, and the number of second POs associated with each first PO is N.

The starting PDCCH occasion of the (i_s+1)-th first PO among the M first POs is the first PDCCH occasion, and the starting PDCCH occasion of the m-th second PO among N second POs associated with the (i_s+1)-th first PO is the second PDCCH occasion.

The index number of the second PDCCH occasion is determined based on third information, the third information indicating a respective starting PDCCH occasion corresponding to each of the N second POs associated with the (i_s+1)-th first PO; or, the index number of the second PDCCH occasion is determined based on fourth information, the fourth information indicating a starting PDCCH occasion of the (m')-th second PO among the N second POs associated with the (i_s+1)-th first PO, where $1 \leq m' \leq N$, $m' \neq m$, and m' is a positive integer.

In an implementation, the starting PDCCH occasion of the (m')-th second PO is a third PDCCH occasion.

A deviation between the second PDCCH occasion and the third PDCCH occasion is |m'-m|*S PDCCH occasions.

In an implementation, the first configuration information includes fifth information, the fifth information indicating a respective search space corresponding to each of at least one second PO associated with the first PO.

In an implementation, there is no interval slot or interval PDCCH occasion between the first PO and any two adjacent POs among the at least one second PO.

In an implementation, there is the first interval between the first PO and any two adjacent POs among the at least one second PO.

In an implementation, the first interval includes one of:
a number of interval slots or a number of interval PDCCH occasions between an ending slot of a former PO and a starting slot of a latter PO among the adjacent POs; or,
a number of interval slots or a number of interval PDCCH occasions between a starting slot of a former PO and a starting slot of a latter PO among the adjacent POs.

In an implementation, there is a second interval between the first PO and a target second PO among the at least one second PO.

In an implementation, the second interval includes one of:
a number of interval slots or a number of interval PDCCH occasions between a starting slot of the first PO and a starting slot of the target second PO; or,
a number of interval slots or a number of interval PDCCH occasions between an ending slot of the first PO and a starting slot of the target second PO.

In an implementation, the interval PDCCH occasion is a PDCCH occasion that does not belong to any PO between an ending of a PO and a starting of another PO, and the PDCCH occasion is in a search space where the second PO is located.

In an implementation, a starting PDCCH occasion of the second PO is a first PDCCH occasion of a starting slot of the second PO.

In an implementation, the number of first POs configured in the first configuration information is M, and the number of second POs associated with each first PO is N.

The starting PDCCH occasion of the (i_s+1)-th first PO among the M first POs is a first PDCCH occasion, and the starting PDCCH occasion of the m-th second PO among N second POs associated with the (i_s+1)-th first PO is a second PDCCH occasion.

An index number of the second PDCCH occasion is determined based on third information, the third information indicating a respective starting PDCCH occasion corresponding to each of the N second POs associated with the (i_s+1)-th first PO; or, an index number of the second PDCCH occasion is determined based on fourth information, the fourth information indicating a starting PDCCH occasion of the (m')-th second PO among the N second POs associated with the (i_s+1)-th first PO, where $1 \leq m' \leq N$, $m' \neq m$, and m' is a positive integer.

In an implementation, the starting PDCCH occasion of the (m')-th second PO is a third PDCCH occasion.

A deviation between the second PDCCH occasion and the third PDCCH occasion is |m'-m|*S PDCCH occasions.

In an implementation, the first PO and the at least one second PO associated with the first PO transmit different scheduling information respectively; or
both the first PO and the at least one second PO associated with the first PO transmit the same scheduling information.

In an implementation, the sending unit 601 is configured to preempt a channel for an available PO in a DRX cycle; in response to successfully preempting a channel for the available PO, send the scheduling information of the paging message in the available PO, and stop sending the scheduling information of the paging message in other available POs after this available PO; and in response to that it is failed to preempt a channel for the available PO, continue to preempt a channel for a first available PO after this available PO.

The available PO is the first PO or the second PO associated with the first PO.

In an implementation, the sending unit 601 is further configured to, when it is failed to preempt a channel for any available PO in the DRX cycle, send the paging failure message to the core network.

In an implementation, the sending unit 601 is further configured to, when it is failed to preempt a channel for any available PO in the DRX cycle, cancel sending the scheduling information of the paging message.

In an implementation, the sending unit 601 is further configured to, when it is failed to preempt a channel for any available PO in the DRX cycle, continue to preempt a channel for an available PO in a next DRX cycle.

In an implementation, the device may further include an obtaining unit 602 and an obtaining unit 602.

The obtaining unit 602 is configured to obtain the first indication information from the core network, the first indication information indicating that the network device can send the scheduling information of the paging message in T DRX cycles, where T is a positive integer.

The sending unit 601 is configured to, when it is failed to preempt a channel in any of the T DRX cycles, send a paging failure message to the core network.

It is understood by those skilled in the art that the related descriptions about the apparatus for configuring a PO according to the embodiments of the present disclosure may be understood with reference to the related descriptions about the method for configuring a PO according to the embodiments of the present disclosure.

Figure 7:
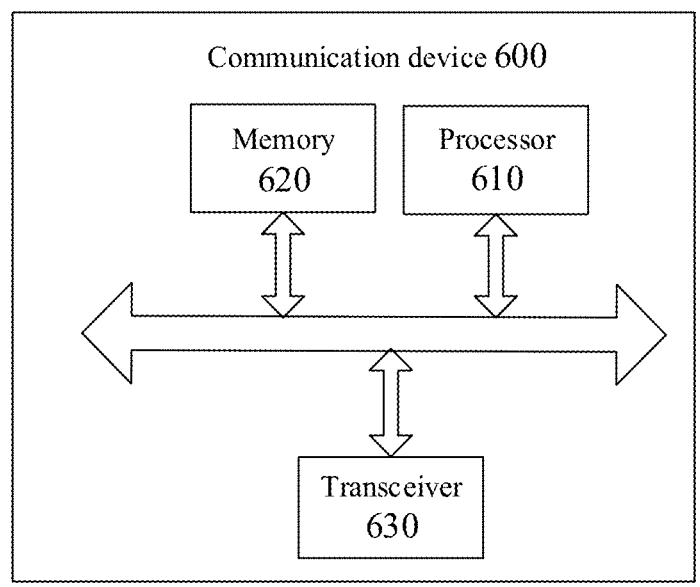
FIG. 7 is a schematic structure diagram of a communication device according to an embodiment of the present disclosure.

FIG. 7 is a schematic structure diagram of a communication device 600 according to an embodiment of the present disclosure. The communication device may be a terminal, or may be a network device. The communication device 600 illustrated in FIG. 7 includes a processor 610, and the processor 610 calls and runs a computer program in a memory to perform the method in the embodiments of the present disclosure.

Optionally, as illustrated in FIG. 7, the communication device 600 may further include a memory 620. The processor 610 may call the computer program from the memory 620 and run the program, to perform the method in the embodiments of the present disclosure.

The memory 620 may be a separate device independent of the processor 610, or may also be integrated in the processor 610.

Optionally, as illustrated in FIG. 7, the communication device 600 may further include a transceiver 630, and the processor 610 may control the transceiver 630 to communicate with another device, specifically sending information or data to the another device or receiving information or data sent by the another device.

The transceiver 630 may include a transmitter and a receiver. The transceiver 630 may further include an antenna. The number of the antennae may be one or more.

Optionally, the communication device 600 may specifically be the network device of the embodiments of the present disclosure, and the communication device 600 may implement corresponding flows implemented by the network device in each method of the embodiments of the present disclosure. For simplicity, elaborations are omitted herein.

Optionally, the communication device 600 may specifically be a mobile terminal/the terminal of the embodiments of the present disclosure, and the communication device 600 may implement corresponding flows implemented by the mobile terminal/terminal in each method of the embodiments of the present disclosure. For simplicity, elaborations are omitted herein.

Figure 8:
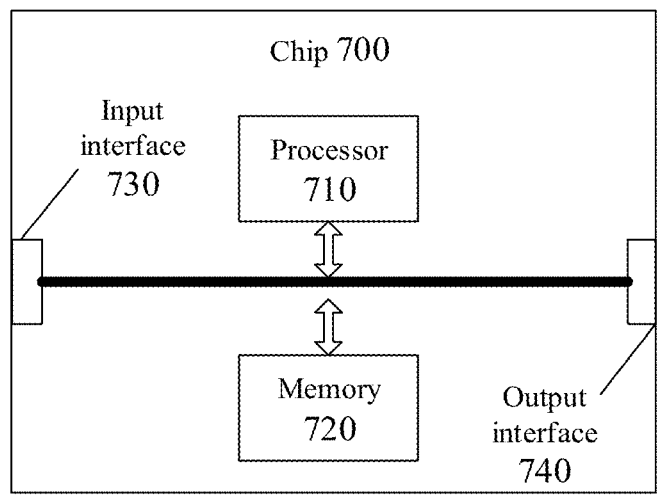
FIG. 8 is a schematic structure diagram of a chip according to an embodiment of the present disclosure.

FIG. 8 is a schematic structure diagram of a chip according to an embodiment of the present disclosure. The chip 700 illustrated in FIG. 8 includes a processor 710, and the processor 710 may call and run a computer program in a memory to perform the method in the embodiments of the present disclosure.

Optionally, as illustrated in FIG. 8, the chip 700 may further include a memory 720. The processor 710 may call and run the computer program in the memory 720 to perform the method in the embodiments of the present disclosure.

The memory 720 may be a separate device independent of the processor 710, or may also be integrated in the processor 710.

Optionally, the chip 700 may further include an input interface 730. The processor 710 may control the input interface 730 to communicate with other devices or chips; specifically, the input interface may acquire information or data sent by other devices or chips.

Optionally, the chip 700 may further include an output interface 740. The processor 710 may control the output interface 740 to communicate with other devices or chips; specifically, the output interface may output information or data to other devices or chips.

Optionally, the chip may be applied to the network device of the embodiments of the present disclosure, and the chip may implement corresponding flows implemented by the network device in each method of the embodiments of the present disclosure. For simplicity, elaborations are omitted herein.

Optionally, the chip may be applied to the mobile terminal/terminal of the embodiment of the present disclosure, and the chip may implement corresponding flows implemented by the mobile terminal/terminal in each method of the embodiments of the present disclosure. For simplicity, elaborations are omitted herein.

It is to be understood that the chip mentioned in the embodiment of the present disclosure may also be called a system-level chip, a system chip, a chip system or a system on chip, etc.

Figure 9:
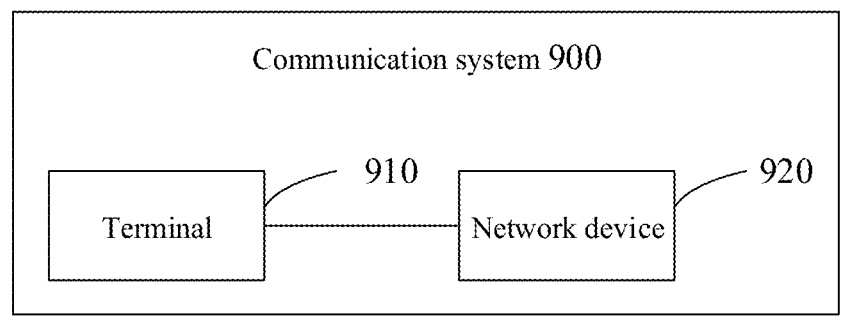
FIG. 9 is a schematic block diagram of a communication system according to an embodiment of the present disclosure.

FIG. 9 is a schematic block diagram of a communication system 900 according to an embodiment of the present disclosure. As illustrated in FIG. 9, the communication system 900 includes a terminal 910 and a network device 920.

The terminal 910 is configured to implement corresponding functions implemented by the terminal in the method, and the network device 920 may be configured to implement corresponding functions implemented by the network device in the method. For simplicity, elaborations are omitted herein.

It is to be understood that the processor in the embodiment of the present disclosure may be an integrated circuit chip and has a signal processing capability. In an implementation process, each step of the method embodiment may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the present disclosure may be implemented or executed. The universal processor may be a microprocessor, or the processor may also be any conventional processor and the like. The steps of the method disclosed in combination with the embodiments of the present disclosure may be directly embodied to be executed and completed by a hardware decoding processor or executed and completed by a combination of hardware and software modules in the decoding processor. The software module may be located in a mature storage medium in the art such as a random access memory (RAM), a flash memory, a read-only memory (ROM), a Programmable ROM (PROM) or Electrically Erasable PROM (EEPROM) and a register. The storage medium is located in a memory, and the processor reads information from the memory, and completes the steps of the methods in combination with hardware.

It can be understood that the memory in the embodiment of the present disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but is not limited to, memories of these and any other proper types.

It is to be understood that the memories above mentioned are exemplarily but unlimitedly described; for example, the memories in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM) and a Direct Rambus RAM (DR RAM). That is, the memories in the embodiments of the present disclosure are intended to include, but are not limited to, memories of these and any other proper types.

The embodiments of the present disclosure also provide a computer-readable storage medium, which is configured to store a computer program.

Optionally, the computer-readable storage medium may be applied to a network device in the embodiments of the present disclosure, and the computer program causes a computer to perform corresponding flows implemented by the network device in each method of the embodiments of the present disclosure. For simplicity, elaborations are omitted herein.

Optionally, the computer-readable storage medium may be applied to a mobile terminal/terminal in the embodiments of the present disclosure, and the computer program causes a computer to perform corresponding flows implemented by the mobile terminal/terminal in each method of the embodiments of the present disclosure. For simplicity, elaborations are omitted herein.

The embodiments of the present disclosure also provide a computer program product, which includes one or more computer program instructions.

Optionally, the computer program product may be applied to a network device in the embodiments of the present disclosure, and the one or more computer program instructions cause a computer to perform corresponding flows implemented by the network device in each method of the embodiments of the present disclosure. For simplicity, elaborations are omitted herein.

Optionally, the computer program product may be applied to a mobile terminal/terminal in the embodiments of the present disclosure, and the one or more computer program instructions cause the computer to execute corresponding flows implemented by the mobile terminal/terminal in each method of the embodiments of the present disclosure. For simplicity, elaborations are omitted herein.

The embodiments of the present disclosure also provide a computer program.

Optionally, the computer program may be applied to a network device in the embodiments of the present disclosure, and the computer program runs in a computer to cause the computer to perform corresponding flows implemented by the network device in each method of the embodiments of the present disclosure. For simplicity, elaborations are omitted herein.

Optionally, the computer program may be applied to a mobile terminal/terminal in the embodiments of the present disclosure, and the computer program runs in the computer to cause the computer to perform corresponding flows implemented by the mobile terminal/terminal in each method of the embodiments of the present disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the present disclosure. The abovementioned storage medium includes: various media capable of storing program codes such as a U disk, a mobile hard disk, a ROM, a RAM, a magnetic disk or an optical disk.

The above is only the specific implementation manner of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for configuring a Paging Occasion (PO), comprising:
receiving, by a terminal, first configuration information from a network device, wherein the first configuration information is used for determining at least one first PO, each of the at least one first PO is associated with at least one second PO, and the first PO and the second PO are used for transmitting scheduling information of a paging message,
characterized in that the paging message comprises a paging Physical Downlink Shared Channel (PDSCH), and
one of the following applies:
each first PO and each of the at least one second PO associated with the first PO are used by the network device to transmit the scheduling information of different paging PDSCHs respectively; or
each first PO and each of the at least one second PO associated with the first PO are used by the network device to transmit the scheduling information of a same paging PDSCH.

2. The method of claim 1, wherein the first configuration information comprises first information indicating a number of second POs associated with the first PO, and correspondences between the second POs and Physical Downlink Control Channel (PDCCH) occasions are predefined through a protocol.

3. The method of claim 2, wherein a number of first POs configured in the first configuration information is M, and a number of second POs associated with each first PO is N;
a starting PDCCH occasion of a (i_s+1)-th first PO among the M first POs is a first PDCCH occasion, and a starting PDCCH occasion of a m-th second PO among N second POs associated with the (i_s+1)-th first PO is a second PDCCH occasion;
a deviation between the second PDCCH occasion and the first PDCCH occasion is m*S PDCCH occasions, wherein 1≤i_s+1≤M, 1≤m≤N, S is a number of SSBs actually transmitted, and M, N, i_s+1, m and S are positive integers.

4. The method of claim 3, wherein when the first configuration information does not comprise second information, an index number of the first PDCCH occasion is i_s*S*(N+1).

5. The method of claim 1, further comprising:
detecting, by the terminal, the scheduling information of the paging message in the first PO;
in response to that the terminal does not detect the scheduling information of the paging message in the first PO, detecting, by the terminal, the scheduling information of the paging message in a next second PO associated with the first PO; or in response to that the terminal detects the scheduling information of the paging message in the first PO, stopping, by the terminal, detecting all the second POs associated with the first PO.

6. The method of claim 5, further comprising:
when the terminal does not detect the scheduling information of the paging message in a i-th second PO associated with the first PO, detecting, by the terminal, the scheduling information of the paging message in a (i+1)-th second PO associated with the first PO, wherein i is a positive integer; or
when the terminal detects the scheduling information of the paging message in a i-th second PO associated with the first PO, stopping, by the terminal, detecting all the second POs after the i-th second PO associated with the first PO.

7. A terminal, comprising:
a transceiver, configured to receive first configuration information from a network device, wherein the first configuration information is used for determining at least one first PO, each of the at least one first PO is associated with at least one second PO, and the first PO and the second PO are used for transmitting scheduling information of a paging message,
characterized in that the paging message comprises a paging Physical Downlink Shared Channel (PDSCH), and
one of the following applies:
each first PO and each of the at least one second PO associated with the first PO are used to transmit the scheduling information of different paging PDSCHs respectively; or
each first PO and each of the at least one second PO associated with the first PO are used to transmit the scheduling information of a same paging PDSCH.

8. The terminal of claim 7, wherein the first configuration information comprises first information indicating a number of second POs associated with the first PO, and correspondences between the second POs and Physical Downlink Control Channel (PDCCH) occasions are predefined through a protocol.

9. The terminal of claim 8, wherein a number of first POs configured in the first configuration information is M, and a number of second POs associated with each first PO is N;
a starting PDCCH occasion of a (i_s+1)-th first PO among the M first POs is a first PDCCH occasion, and a starting PDCCH occasion of a m-th second PO among N second POs associated with the (i_s+1)-th first PO is a second PDCCH occasion;
a deviation between the second PDCCH occasion and the first PDCCH occasion is m*S PDCCH occasions, wherein 1≤i_s+1≤M, 1≤m≤N, S is a number of SSBs actually transmitted, and M, N, i_s+1, m and S are positive integers.

10. The terminal of claim 9, wherein when the first configuration information does not comprise second information, an index number of the first PDCCH occasion is i_s*S*(N+1).

11. The terminal of claim 7, further comprising:
a processor, configured to: detect the scheduling information of the paging message in the first PO; in response to that no scheduling information of the paging message is detected in the first PO, detect the scheduling information of the paging message in a next second PO associated with the first PO; or in response to that the scheduling information of the paging message is detected in the first PO, stop detecting all the second POs associated with the first PO.

12. The terminal of claim 11, wherein the processor is configured to:
   when no scheduling information of the paging message is detected in a i-th second PO associated with the first PO, detect the scheduling information of the paging message in a (i+1)-th second PO associated with the first PO, wherein i is a positive integer; or
   when the scheduling information of the paging message is detected in a i-th second PO associated with the first PO, stop detecting all the second POs after the i-th second PO associated with the first PO.

13. A non-transitory computer-readable storage medium having stored therein a computer program that, when executed by a computer, causes the computer to perform operations comprising:
   receiving first configuration information from a network device, wherein the first configuration information is used for determining at least one first PO, each of the at least one first PO is associated with at least one second PO, and the first PO and the second PO are used for transmitting scheduling information of a paging message,
   characterized in that the paging message comprises a paging Physical Downlink Shared Channel (PDSCH), and
   one of the following applies:
   each first PO and each of the at least one second PO associated with the first PO are used by the network device to transmit the scheduling information of different paging PDSCHs respectively; or
   each first PO and each of the at least one second PO associated with the first PO are used by the network device to transmit the scheduling information of a same paging PDSCH.

14. The non-transitory computer-readable storage medium of claim 13, wherein the first configuration information comprises first information indicating a number of second POs associated with the first PO, and correspondences between the second POs and Physical Downlink Control Channel (PDCCH) occasions are predefined through a protocol.

15. The non-transitory computer-readable storage medium of claim 14, wherein a number of first POs configured in the first configuration information is M, and a number of second POs associated with each first PO is N;
   a starting PDCCH occasion of a (i_s+1)-th first PO among the M first POs is a first PDCCH occasion, and a starting PDCCH occasion of a m-th second PO among N second POs associated with the (i_s+1)-th first PO is a second PDCCH occasion;
   a deviation between the second PDCCH occasion and the first PDCCH occasion is m*S PDCCH occasions, wherein $1 \leq i\_s+1 \leq M$, $1 \leq m \leq N$, S is a number of SSBs actually transmitted, and M, N, i_s+1, m and S are positive integers.

16. The non-transitory computer-readable storage medium of claim 15, wherein when the first configuration information does not comprise second information, an index number of the first PDCCH occasion is i_s*S*(N+1).

17. The non-transitory computer-readable storage medium of claim 13, wherein the computer program, when expected by the computer, causes the computer further to perform operations comprising:
   detecting the scheduling information of the paging message in the first PO;
   in response to that a terminal does not detect the scheduling information of the paging message in the first PO, detecting the scheduling information of the paging message in a next second PO associated with the first PO; or
   in response to that the terminal detects the scheduling information of the paging message in the first PO, stopping detecting all the second POs associated with the first PO.

18. The non-transitory computer-readable storage medium of claim 17, wherein the computer program, when expected by the computer, causes the computer further to perform operations comprising:
   when the terminal does not detect the scheduling information of the paging message in a i-th second PO associated with the first PO, detecting the scheduling information of the paging message in a (i+1)-th second PO associated with the first PO, wherein i is a positive integer; or
   when the terminal detects the scheduling information of the paging message in a i-th second PO associated with the first PO, stopping detecting all the second POs after the i-th second PO associated with the first PO.

* * * * *